(12) United States Patent
Wu et al.

(10) Patent No.: US 12,236,589 B2
(45) Date of Patent: Feb. 25, 2025

(54) SYSTEM AND METHOD FOR GENERATING A THREE-DIMENSIONAL IMAGE WHERE A POINT CLOUD IS GENERATED ACCORDING TO A SET OF COLOR IMAGES OF AN OBJECT

(71) Applicant: QISDA CORPORATION, Taoyuan (TW)

(72) Inventors: Chuang-Wei Wu, Taoyuan (TW); Hung-Chih Chan, Taoyuan (TW); Lung-Kai Cheng, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 380 days.

(21) Appl. No.: 17/693,456

(22) Filed: Mar. 14, 2022

(65) Prior Publication Data

US 2023/0214995 A1    Jul. 6, 2023

(30) Foreign Application Priority Data

Dec. 31, 2021 (CN) .......................... 202111666609.9

(51) Int. Cl.
| | | |
|---|---|---|
| *G06T 7/00* | (2017.01) | |
| *G06T 7/40* | (2017.01) | |
| *G06T 7/521* | (2017.01) | |
| *G06T 7/73* | (2017.01) | |
| *G06V 10/46* | (2022.01) | |
| *G06V 10/56* | (2022.01) | |

(52) U.S. Cl.
CPC .............. *G06T 7/0012* (2013.01); *G06T 7/40* (2013.01); *G06T 7/521* (2017.01); *G06T 7/73* (2017.01); *G06V 10/46* (2022.01); *G06V 10/56* (2022.01); *G06T 2207/10024* (2013.01); *G06T 2207/30036* (2013.01)

(58) Field of Classification Search
CPC ......... G06T 7/521; G06T 7/0012; G06T 7/40; G06T 7/00; G06T 7/73; G06T 2207/10024; G06T 2207/30036; G06V 10/46; G06V 10/56
See application file for complete search history.

(56) References Cited

U.S. PATENT DOCUMENTS

| | | | |
|---|---|---|---|
| 10,912,717 B2* | 2/2021 | Montgomery | ............ A61K 6/20 |
| 11,295,460 B1* | 4/2022 | Aghdasi | .................... G06T 7/97 |
| 2018/0204379 A1* | 7/2018 | Mendoza | ................ G06T 9/007 |

* cited by examiner

*Primary Examiner* — Tuan H Nguyen

(57) ABSTRACT

A method for generating a three-dimensional image includes capturing a set of color images of an object, generating a first point cloud according to at least the set of color images, generating a second point cloud by performing a filtering operation to the first point cloud according to the set of color images, selectively performing a pairing operation using the second point cloud and a target point cloud to generate pose information, and combining the first point cloud and the target point cloud according to the pose information to update the target point cloud to generate the three-dimensional image of the object. The set of color images is related to color information of the object. The relativity of the second point cloud and the rigid surface is higher than the relativity of the second point cloud and the non-rigid surface.

11 Claims, 6 Drawing Sheets

SYSTEM AND METHOD FOR GENERATING A THREE-DIMENSIONAL IMAGE WHERE A POINT CLOUD IS GENERATED ACCORDING TO A SET OF COLOR IMAGES OF AN OBJECT

BACKGROUND OF THE INVENTION

1. Field of the Invention

The application is related to a system and a method for generating a three-dimensional image, and more particularly, a system and a method for generating and improving a three-dimensional image where a point cloud is generated according to a set of color images of an object.

2. Description of the Prior Art

With the development of technology, more and more professionals are willing to use optical auxiliary devices to improve the convenience and accuracy of operation. For example, in dentistry, there are intraoral scanners to assist dentists in detecting the oral cavity. Intraoral scanners can capture intraoral images and convert them into digital data to assist professionals such as dentists and denture technicians in diagnosis, treatment and denture fabrication.

However, in practice, when using an intraoral scanner to obtain images of teeth, images of the gums and tongue are also obtained, and these non-tooth images often cause interference, which reduces the quality of the captured tooth images. In addition, the interference often causes a newly captured image failing to be successfully merged into the generated three-dimensional (3D) image, resulting in a decrease of the operation speed.

Therefore, there is still a lack of suitable solutions in the field to avoid the above-mentioned interference and improve the quality of the captured images.

SUMMARY OF THE INVENTION

An embodiment provides a method for generating a three-dimensional image. The method includes capturing a set of color images of an object, generating a first point cloud according to at least the set of color images, generating a second point cloud by performing a filtering operation to the first point cloud according to the set of color images, selectively performing a pairing operation using the second point cloud and a target point cloud to generate pose information, and combining the first point cloud and the target point cloud according to the pose information to update the target point cloud to generate the three-dimensional image of the object. The set of color images is related to color information of the object. The first point cloud is related to a rigid surface and a non-rigid surface of the object. The relativity of the second point cloud and the rigid surface is higher than the relativity of the second point cloud and the non-rigid surface.

Another embodiment provides a system for generating a three-dimensional image. The system includes a scanner, a processor and a display. The scanner is used to capture a set of color images of an object. The set of color images is related to color information of the object. The processor is used to generate a first point cloud according to the set of color images, generate a second point cloud by performing a filtering operation to the first point cloud according to the set of color images, selectively perform a pairing operation using the second point cloud and a target point cloud to generate pose information, and combine the first point cloud and the target point cloud according to the pose information to update the target point cloud to generate the three-dimensional image of the object. The display is used to display the three-dimensional image of the object. The first point cloud is related to a rigid surface and a non-rigid surface of the object, and a relativity of the second point cloud and the rigid surface is higher than a relativity of the second point cloud and the non-rigid surface.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
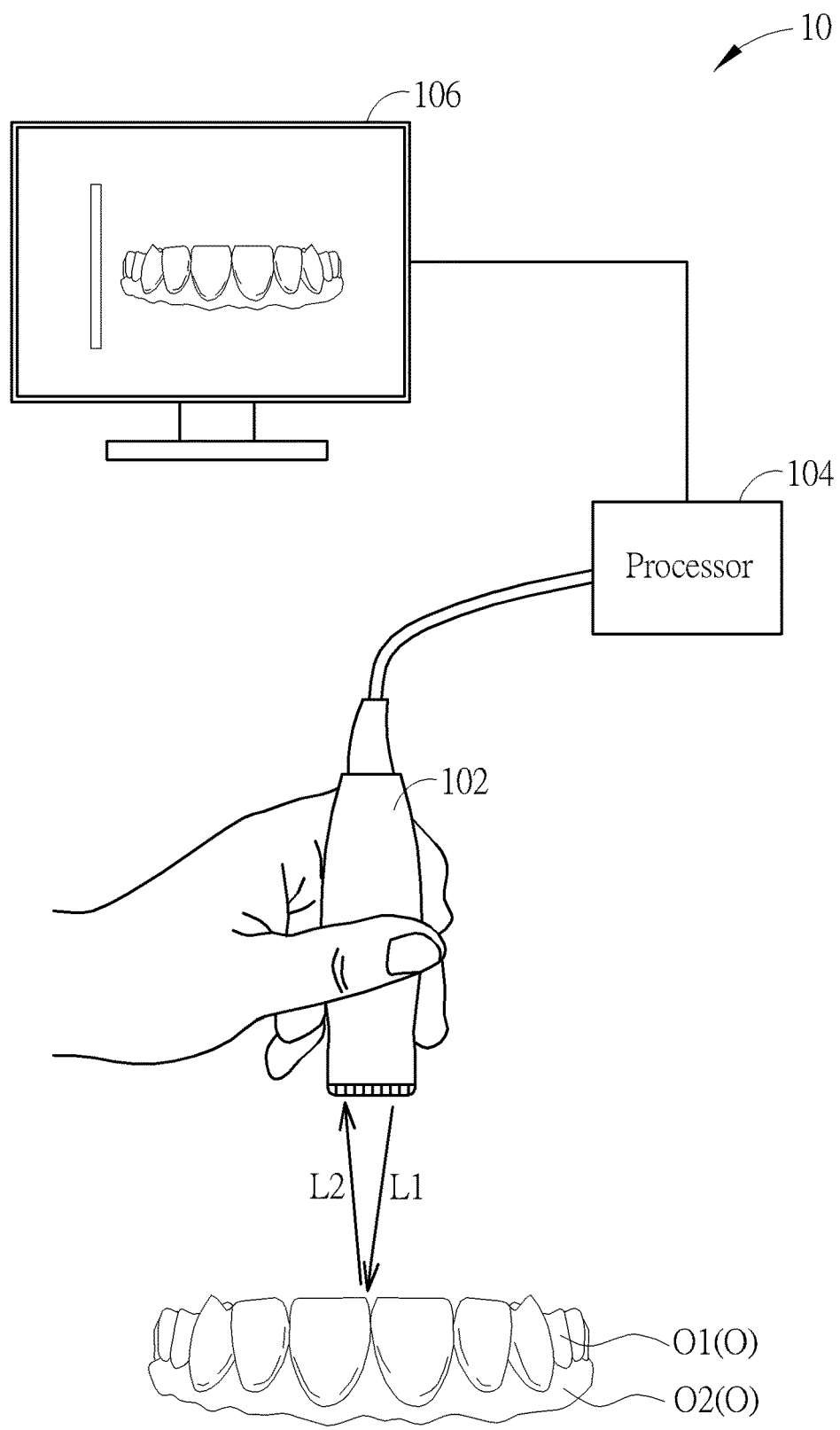
FIG. 1 illustrates a system for generating a three-dimensional image according to an embodiment of the present invention.

In order to improve and avoid interfering the quality of captured images, a solution is provided as below. FIG. 1 illustrates a system 10 for generating a three-dimensional image. As shown in FIG. 1, the system 100 can include a scanner 102, a processor 104 and a display 106. The scanner 102 can scan an object O, the processor 104 can process the related data, and the display 106 can display the three-dimensional image of the object O accordingly. For example, the scanner 102 can be an intraoral scanner, and the object O can be an oral cavity. As shown in FIG. 1, the object O can include a rigid surface O1 (e.g., teeth) and a non-rigid surface O2 (e.g., gums and tongue).

As shown in FIG. 1, when scanning the object O to generate the three-dimensional image, light L1 can be projected to the object O, and reflected light L2 can be received to capture an image.

For example, the light L1 may have a predetermined structural light pattern, such as a striped pattern or a checkered pattern. The scanner 102 can capture the image of the scanned object O, and the distribution of the light pattern on the received image can be decoded to obtain a point cloud. Each point cloud can include a set of data points located in the space, and be used to represent the three-dimensional shape of the object O. Taking intraoral scanning as an example, a user can move the scanner 102 (e.g., a dentist can hold an intraoral scanner and move it gradually) to scan a plurality of parts of an oral cavity to capture a plurality of images. The captured images can be combined to generate a more complete three-dimensional image. For example, the interference caused by the non-rigid surface O2 can be suppressed by using the color information of the object O, so the three-dimensional image of the object O can be better formed, as described below.

Figure 2:
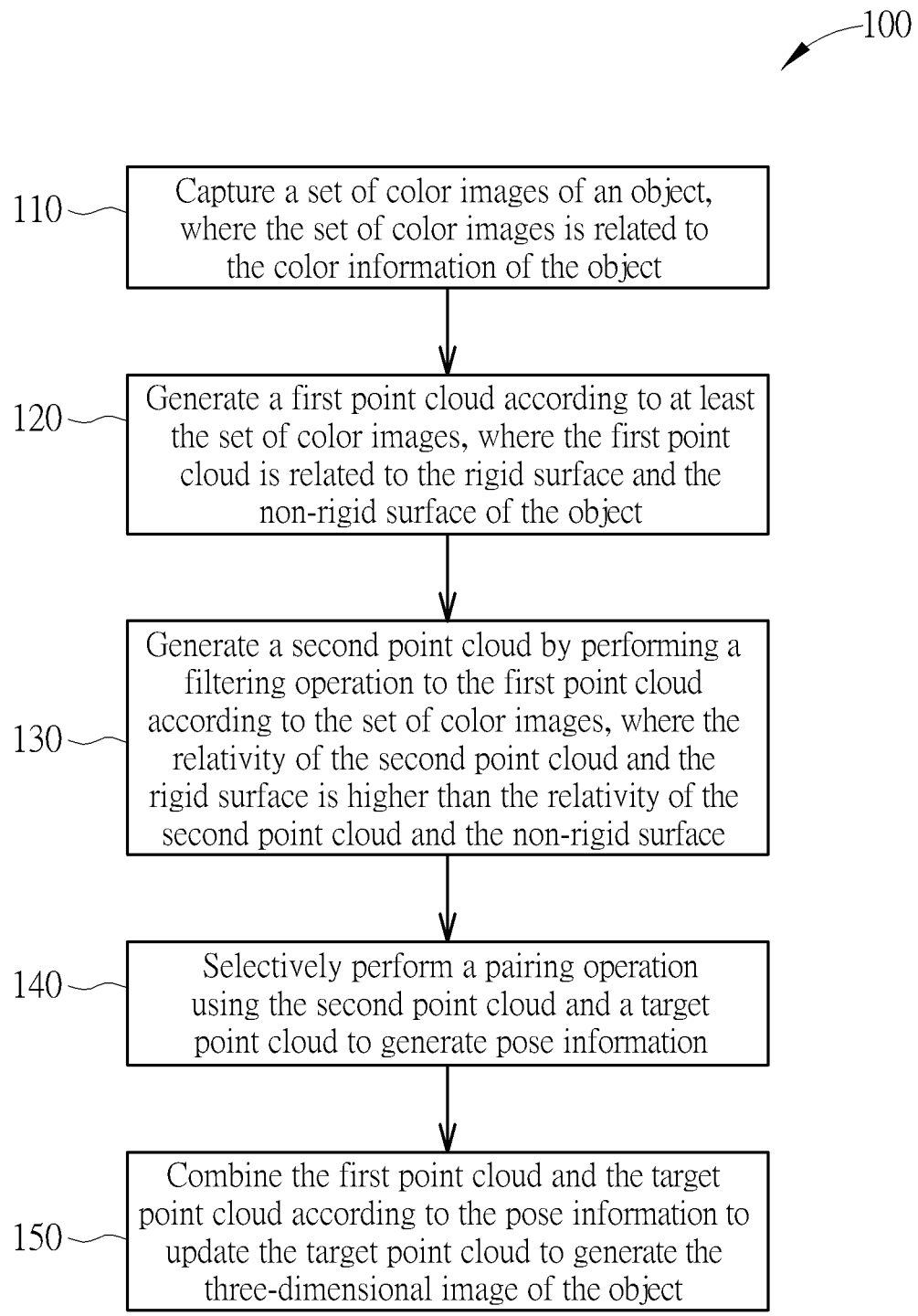
FIG. 2 illustrates a flowchart of a method for generating the three-dimensional image of the object shown in FIG. 1.

FIG. 2 illustrates a flowchart of a method 100 for generating the three-dimensional image of the object O. The method 100 can include the following steps.

Figure 5:
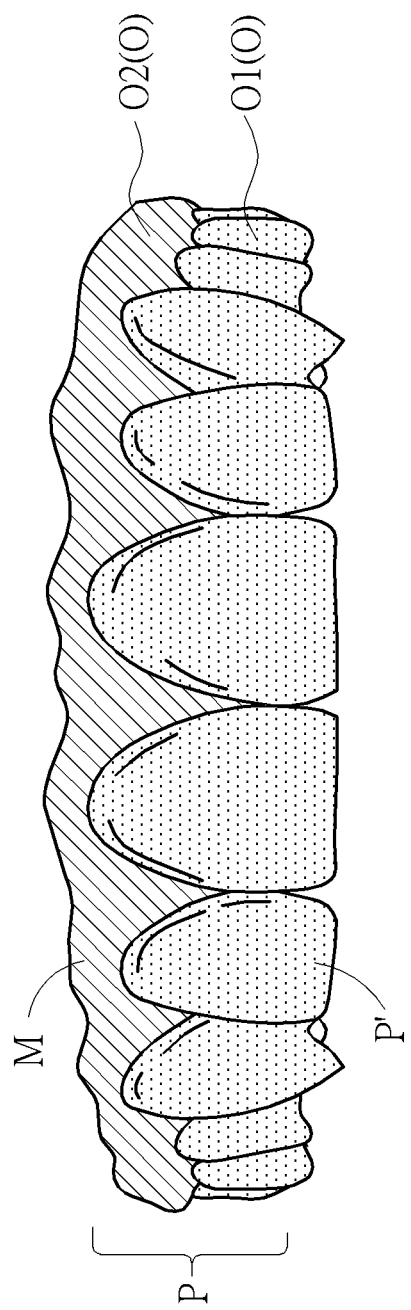
FIG. 5 illustrates that the first point cloud is processed using a mask in the flow of FIG. 4.

Step 110: capture a set of color images of an object O, where the set of color images is related to the color information of the object O;

Step 120: generate a first point cloud P (as shown in FIG. 5) according to at least the set of color images, where the first point cloud P is related to the rigid surface O1 and the non-rigid surface O2 of the object O;

Step 130: generate a second point cloud P' (as shown in FIG. 5) by performing a filtering operation to the first point cloud P according to the set of color images, where the relativity of the second point cloud P' and the rigid surface O1 is higher than the relativity of the second point cloud P' and the non-rigid surface O2;

Step 140: selectively perform a pairing operation using the second point cloud P' and a target point cloud to generate pose information; and Step 150: combine the first point cloud P and the target point cloud according to the pose information to update the target point cloud to generate the three-dimensional image of the object O.

As shown in FIG. 1 and FIG. 2, Step 110 can be performed using the scanner 120, Step 120 to Step 150 can be performed using the processor 104, and the three-dimensional image generated in Step 150 can be displayed using the display 106.

The method 100 is described below by taking intraoral scanning as an example. In the method 100, the object O can be a region around teeth. Hence, the object O can include the rigid surface O1 (e.g., teeth) and the non-rigid surface (e.g., gums and tongue, which are not the teeth).

In Step 110, the set of color images can include a plurality of images captured by sequentially projecting light of a plurality of colors (e.g., red, green, blue, etc.) or light of a plurality of wavelength (e.g., visible light, ultraviolet, infrared light, etc.) to the object O, and receiving the reflected light. Hence, the color information of the object O can be generated according to the set of color images.

In Step 120, the generated first point cloud P can represent the shape of the rigid surface O1 and the non-rigid surface O2 of the object O in a three-dimensional space.

Since the degrees of reflecting and receiving light of the rigid surface O1 and the non-rigid surface O2 are different, Step 130 can be performed accordingly. In Step 130, a filtering operation can be performed to the first point cloud P according to the color information of the object O to generate the second point cloud P'. The relativity of the second point cloud P' and the rigid surface O1 (e.g., a surface of teeth) is higher than the relativity of the second point cloud P' and the non-rigid surface O2 (e.g., a surface of gums). In another example, the second point cloud P' is related to the rigid surface O1 and is not related to the non-rigid surface O2. In other words, compared with the first point cloud P, in the second point cloud P', the proportion of the data of the rigid surface O1 is higher, and the proportion of the data of the non-rigid surface O2 is lower since the data of the non-rigid surface O2 has been filtered out.

In Step 140, for example, the pairing operation can include an iterative closest point (ICP) operation, but embodiments are not limited thereto. The target point cloud can be a resultant point cloud formed by combining the generated point clouds. For example, when an intraoral scanner is moved to capture images of a plurality of portions of an oral cavity, a plurality of point clouds can be generated according to the images, and the point clouds can be combined in sequence to generate and update the target point cloud. Hence, the target point cloud can be corresponding to a larger and more complete three-dimensional image of the object O.

In Step 140, if the proportion of the points that can be paired between the second point cloud P' and the target point cloud is too low, the pairing operation can be discarded. Hence, the pairing operation can be selectively performed. For example, if a dentist move the intraoral scanner too fast, the regions corresponding to the second cloud point P' and the target point cloud may be too far apart, thus the proportion of the points that can be paired may be insufficient, and the second point cloud P' will not be combined with the target point cloud.

In Step 140, the pose information can include a pose matrix, a rotation matrix and/or a translation matrix. The pose information can be a function describing the positional relationship between the newly introduced second point cloud P' and the target point cloud.

The pose information in Step 140 is generated according to the second point cloud P' and the target point cloud, and is not generated according to the first point cloud P and the target point cloud. Since the pose information is generated according to the second point cloud P', and the second point cloud P' is more related to the rigid surface O1, the effect and interference caused by the non-rigid surface O2 are decreased by using the pose information to combine the a new point cloud and the target point cloud.

In Step 150, the interference caused by the non-rigid surface O2 is decreased by using the pose information to combine the first point cloud P and the target point cloud, thereby improving the smoothness of scanning and the quality of the merged three-dimensional image.

Figure 3:
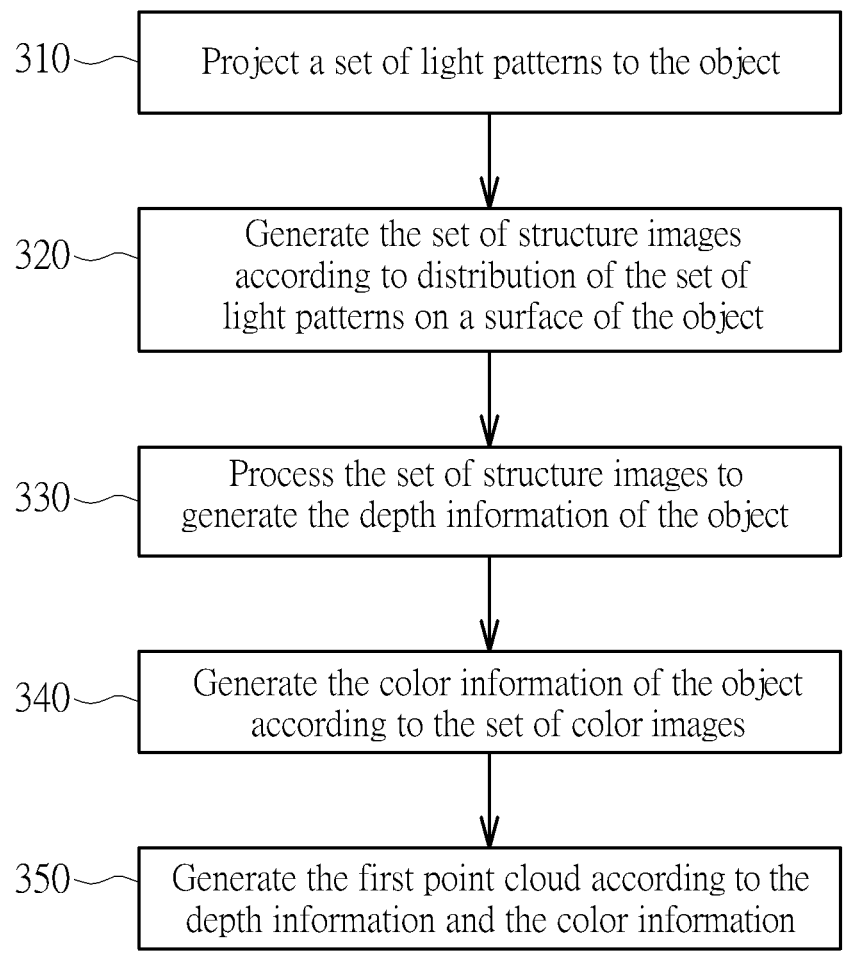
FIG. 3 illustrates a flowchart of capturing the structure images and generating the first point cloud according to the structure images and the color images.

In FIG. 1, a set of structure images of the object O can be further captured. The set of structure images can be related to depth information of the object O. In Step 120, the first point cloud P can be generated according to the set of color images and the set of structure images. FIG. 3 illustrates a flowchart of capturing the structure images and generating the first point cloud P according to the structure images and the color images. As shown in FIG. 3, the flow can include the following steps.

Step 310: project a set of light patterns to the object O;

Step 320: generate the set of structure images according to distribution of the set of light patterns on a surface of the object O;

Step 330: process the set of structure images to generate the depth information of the object O;

Step 340: generate the color information of the object O according to the set of color images; and Step 350: generate the first point cloud P according to the depth information and the color information.

The set of light patterns in Step 310 can include predetermined pattern(s), such as a striped pattern and/or a checkered pattern. For example, the set of light patterns in Step 310 can include a plurality of light patterns with different stripe widths and stripe spacings.

In Step 320, the light pattern(s) can be projected to the object O, and the distribution of the light pattern(s) on the object O can be photographed to generate structure images, so the depth information can be generated accordingly in Step 330.

Step 340 can be corresponding to Step 110 of FIG. 2, and the first point cloud P can be generated according to the depth information and the color information of the object O. The depth information is related to the three-dimensional structure of the object O, and the color information is related to the color(s) of the object O.

The scanner 102 of FIG. 1 can be used for performing Step 310 and Step 320, and capturing the structure images of the object O. The processor 104 of FIG. 1 can be used for performing Step 330 to Step 350.

Figure 4:
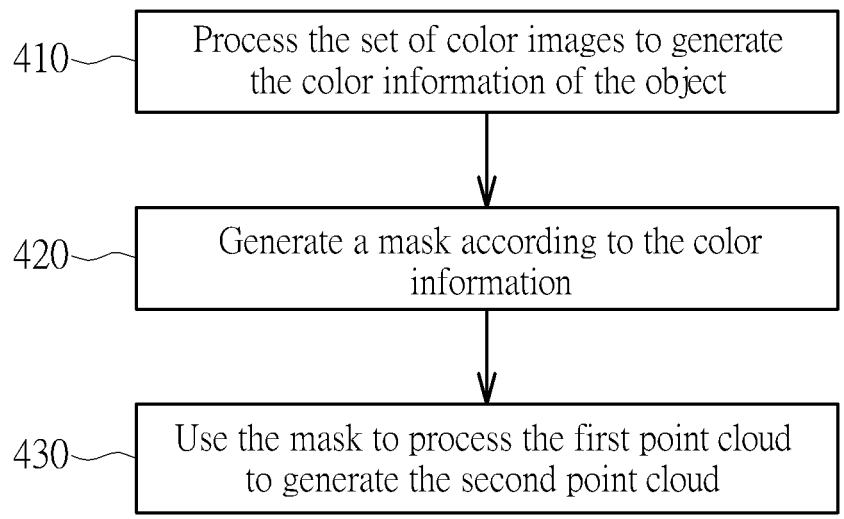
FIG. 4 illustrates a flowchart of generating the second point cloud by performing a filtering operation to the first point cloud according to the set of color images in the flow of FIG. 2.

FIG. 4 illustrates a flowchart of generating the second point cloud P' by performing a filtering operation to the first point cloud P according to the set of color images. In other words, FIG. 4 illustrates a flowchart of Step 130 of FIG. 2. FIG. 5 illustrates that the first point cloud P is processed using a mask M in the flow of FIG. 4. As shown in FIG. 4, the following steps can be performed.

Step 410: process the set of color images to generate the color information of the object O;

Step 430: generate a mask M according to the color information; and

Step 430: use the mask M to process the first point cloud P to generate the second point cloud P'.

In Step 410, the color information can be RGB (red-green-blue) color information. In Step 420, the color information can be converted to a color space information. For example, a Gaussian blur process can be performed according to the color information, and a color space conversion can be further performed to convert the RGB color information to the color space information.

For example, the color space information can include HSV (hue-saturation-value) information, HSL (hue-saturation-lightness) information and/or YUV (luminance-chrominance) information.

Then, an upper limit and a lower limit can be used to process the color space information (e.g., HSV information, HSL information and/or YUV information) to select a portion of data points (expressed as P1) of the first point cloud P. For example, the data points P1 can be corresponding to teeth instead of gums. The mask M can be generated according to the selected data points P1. The number of data points of the first point cloud P can be larger than or equal to the number of data points of the data points P1.

For example, if the color space information is HSV information, a corresponding value (e.g., a value between 0 and 255) of each data point of the first point cloud P in an HSV space can be obtained. Hence, according to the predetermined upper limit and lower limit, the data points of the non-rigid surface O2 (e.g., gums and tongue) can be filtered out, and the remained data points P1 can be corresponding to the rigid surface O1 (e.g., teeth).

Because RGB color information is easily affected by the intensity of light, the color information is converted to the color space information, and the quality of the generated image is improved.

In Step 420, a binarization process can be performed according to the color space information to generate the mask M. The binarization process can classify the colors into two categories, such as black and white. Hence, after performing the binarization process, the mask M can be generated using the region determined to be the non-rigid surface O2.

As shown in FIG. 5, the mask M generated in Step 420 may correspond to the non-rigid surface O2 (e.g., the portion of gums) of the object O. Therefore, in Step 430, the mask M can be used to cover the first point cloud P, and the data points corresponding to the non-rigid surface O2 can be filtered out. As a result, the second point cloud P' with a higher relation with the rigid surface O1 can be generated.

The light L1 with a predetermined structural light pattern (e.g., striped light pattern) can be projected to the object O, and the reflected light L2 can be received to generate an image. Then, the abovementioned mask M can cover the generated image. Afterward, new depth information can be generated by performing a decoding operation. Then, a paring operation (e.g., an iterative closest point operation) can be performed to generate pose information (e.g., a pose matrix). The pose information can be used to combine the first point cloud P to the target point cloud to update the target point cloud.

For example, the target point cloud mentioned in Step 140 and Step 150 can be related to the rigid surface O1 and the non-rigid surface O2 of the object O. For example, the target point cloud can include data points of surfaces of teeth and gums.

In another example, the target point cloud is related to the rigid surface O1 and is not related to the non-rigid surface O2. For example, the target point cloud can include data points of teeth instead of gums.

In another example, a set of new images of the object O can be captured to generate a new point cloud. Then, the new point cloud can be combined to a portion (expressed as Q1) of the target point cloud to update the target point cloud. The new point cloud is related to the rigid surface and the non-rigid surface, and the portion Q1 of the target point cloud is related to the rigid surface and is not related to the non-rigid surface. For example, the scanner 102 of FIG. 1 can scan the object O to generate new images, and new point clouds can be generated accordingly. The new point clouds can include information of teeth and gums. However, the portion Q1 of the target point cloud used to be combined with the new point clouds can include the information of teeth instead of gums.

Figure 6:
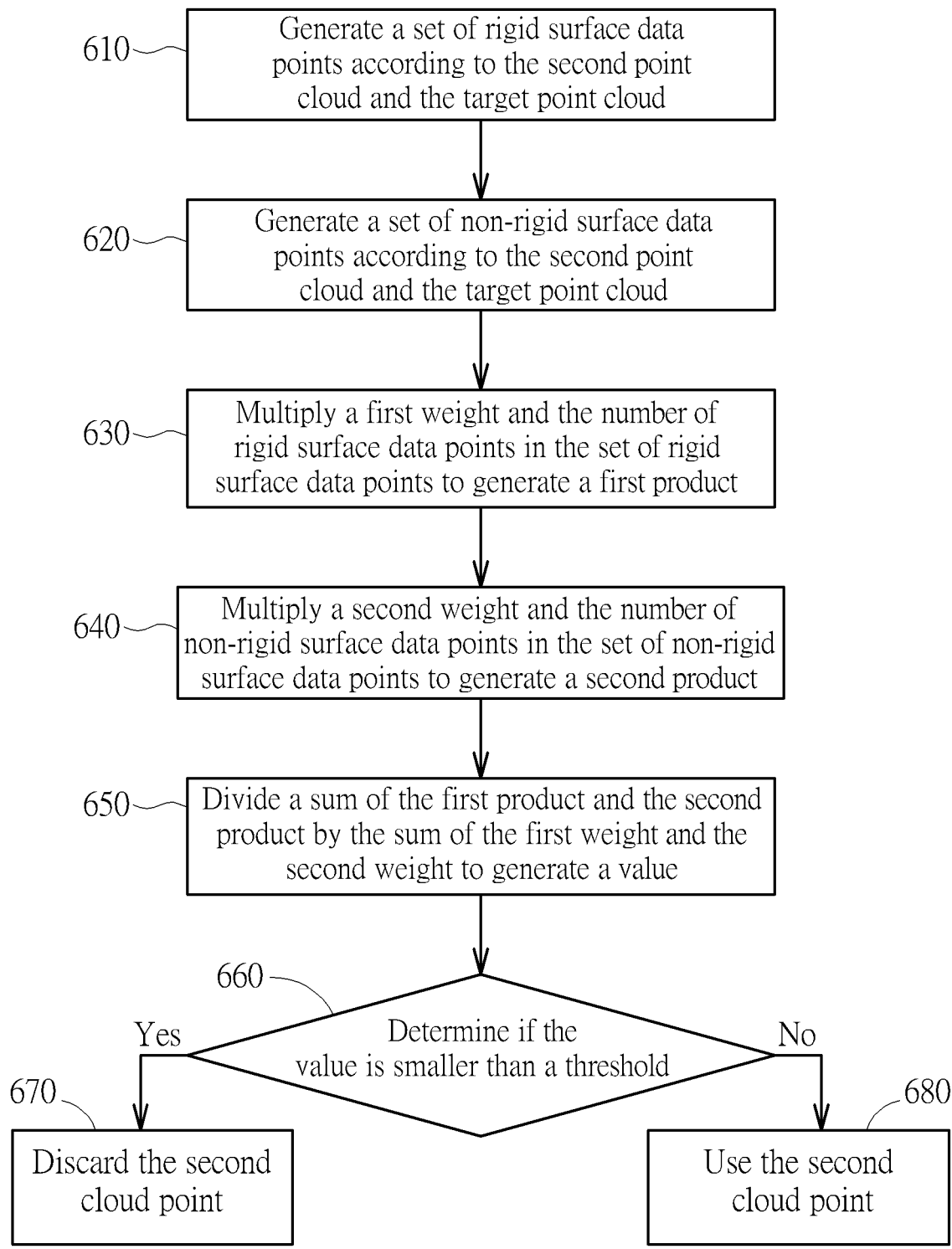
FIG. 6 illustrates a flowchart of determining whether the second point cloud is used in the pairing operation of FIG. 2.

FIG. 6 illustrates a flowchart of determining whether the second point cloud P' is used in the pairing operation of Step 140 of FIG. 2. As shown in FIG. 6, the flow can include following steps.

Step 610: generate a set of rigid surface data points (expressed as P'1) according to the second point cloud P' and the target point cloud;

Step 620: generate a set of non-rigid surface data points (expressed as P'2) according to the second point cloud P' and the target point cloud;

Step 630: multiply a first weight (expressed as W1) and the number of rigid surface data points in the set of rigid surface data points P'1 to generate a first product;

Step 640: multiply a second weight (expressed as W2) and the number of non-rigid surface data points in the set of non-rigid surface data points P'2 to generate a second product; and Step 650: divide a sum of the first product and the second product by the sum of the first weight W1 and the second weight W2 to generate a value (expressed as V);

Step 660: determine if the value V is smaller than a threshold; if yes, enter Step 670; otherwise, enter Step 680;

Step 670: discard the second cloud point P'.

Step 680: use the second cloud point P'.

Step 630 to Step 650 can be expressed as the following equation:

$$V=[(P'1 \times W1)+(P'2 \times W2)]/(W1+W2).$$

For example, the first weight W1 (e.g., the weight of the teeth portion) can be 0.8, and the second weight W2 (e.g., the weight of the non-tooth portion) can be 0.2. In another example, the first weight can be 0.5, and the second weight can be 0.5. By processing data with a weighted calculation, the data of the non-rigid surface O2 may not be completely excluded.

In the flow of FIG. 6, the data of the non-rigid surface O2 may not be completely excluded, and the data of the rigid surface O1 and the non-rigid surface O2 can be processed with a weighted calculation. In Step 670, it can be determined that the pairing operation fails, and the second cloud point P' can be discarded. In Step 680, it can be determined that the pairing operation is successfully performed, the second point cloud P' can be continuously used, so the abovementioned pose information (e.g., a pose matrix) can be generated and used for combining the newly generated point cloud to the target point cloud, and the new captured image can be merged into the target image accordingly.

If most of the data points of the new captured images are corresponding to the non-rigid surface O2, for example, 80% of the data points belong to the non-teeth surface, the flow can be dynamically adjusted to enter a combination mode for combining the non-rigid surface. Alternatively, the flow can enter a weak combination mode, where the priority of smoothness is higher, so the scanning accuracy of the region can be properly decreased, and the smoothness of the scanning operation is improved.

In summary, by means of the system and method provided by embodiments, the interference caused by the non-rigid surface O2 is reduced, the pose information is generated accordingly, and the new captured images are merged into the target image accordingly. As a result, the quality of the generated three-dimensional image is improved. For example, the interferences caused by gums and a tongue can be reduced when scanning an oral cavity, and the modeling quality of the three-dimensional image of the teeth can be improved. Since the unwanted interference is reduced, the failure rate of pairing the point clouds is reduced. Hence, the probability of being interrupted is decreased, the failure rate of image merging is decreased, the smoothness of the scanning operation is improved, and the scanning operation can be speeded up. Hence, a solution against the difficulties related to scanning operation is provided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for generating a three-dimensional image, comprising:
   capturing a set of color images of an object, wherein the set of color images is related to color information of the object;
   capturing a set of structure images of the object, wherein the set of structure images is related to depth information of the object;
   generating a first point cloud according to the set of color images and the set of structure images, wherein the first point cloud is related to a rigid surface and a non-rigid surface of the object;
   generating a second point cloud by performing a filtering operation to the first point cloud according to the set of color images, wherein a relativity of the second point cloud and the rigid surface is higher than a relativity of the second point cloud and the non-rigid surface;
   selectively performing a pairing operation using the second point cloud and a target point cloud to generate pose information; and
   combining the first point cloud and the target point cloud according to the pose information to update the target point cloud to generate the three-dimensional image of the object;
   wherein:
   capturing the set of structure images of the object, comprises:
      projecting a set of light patterns to the object; and
      generating the set of structure images according to distribution of the set of light patterns on a surface of the object; and
   generating the first point cloud according to the set of color images and the set of structure images, comprises:
      processing the set of structure images to generate the depth information of the object;
      generating the color information of the object according to the set of color images; and
      generating the first point cloud according to the depth information and the color information.

2. The method of claim 1, wherein the second point cloud is related to the rigid surface and is not related to the non-rigid surface.

3. The method of claim 1, wherein generating the second point cloud by performing the filtering operation to the first point cloud according to the set of color images, comprises:
   processing the set of color images to generate the color information of the object;
   generating a mask according to the color information; and
   using the mask to process the first point cloud to generate the second point cloud.

4. The method of claim 3, wherein:
   the color information of the object comprises RGB color information; and
   generating the mask according to the color information, comprises:
      converting the color information to color space information;
      using an upper limit and a lower limit to process the color space information to select a portion of data points of the first point cloud;
      generating the mask according to the selected portion of data points.

5. The method of claim 1, wherein the target point cloud is related to the rigid surface and the non-rigid surface.

6. The method of claim 1, wherein the target point cloud is related to the rigid surface and is not related to the non-rigid surface.

7. The method of claim 1, further comprising:
   capturing a set of new images to generate a new point cloud; and
   combining the new point cloud to a portion of the target point cloud to update the target point cloud;
   wherein the new point cloud is related to the rigid surface and the non-rigid surface, and the portion of the target point cloud is related to the rigid surface and is not related to the non-rigid surface.

8. The method of claim 1, wherein the pairing operation comprises:
   generating a set of rigid surface data points according to the second point cloud and the target point cloud;
   generating a set of non-rigid surface data points according to the second point cloud and the target point cloud;
   multiplying a first weight and a number of rigid surface data points in the set of rigid surface data points to generate a first product;

multiplying a second weight and a number of non-rigid surface data points in the set of non-rigid surface data points to generate a second product; and dividing a sum of the first product and the second product by a sum of the first weight and the second weight to generate a value; and wherein the method further comprises:

if the value is lower than a threshold, discarding the second point cloud.

9. The method of claim 1, wherein the paring operation comprises an iterative closest point (ICP) operation.

10. A system for generating a three-dimensional image, comprising:

a scanner configured to capture a set of color images and a set of structure images of an object, wherein the set of color images is related to color information of the object, and the set of structure images is related to depth information of the object;

a processor configured to generate a first point cloud according to the set of color images and the set of structure images, generate a second point cloud by performing a filtering operation to the first point cloud according to the set of color images, selectively perform a pairing operation using the second point cloud and a target point cloud to generate pose information, and combine the first point cloud and the target point cloud according to the pose information to update the target point cloud to generate the three-dimensional image of the object; and a display configured to display the three-dimensional image of the object;

wherein the first point cloud is related to a rigid surface and a non-rigid surface of the object, and a relativity of the second point cloud and the rigid surface is higher than a relativity of the second point cloud and the non-rigid surface;

wherein the scanner captures the set of structure images of the object by:

projecting a set of light patterns to the object; and generating the set of structure images according to distribution of the set of light patterns on a surface of the object; and wherein the processor generates the first point cloud according to the set of color images and the set of structure images by:

processing the set of structure images to generate the depth information of the object;

generating the color information of the object according to the set of color images; and generating the first point cloud according to the depth information and the color information.

11. The system of claim 10, wherein the scanner comprises an intraoral scanner, the object comprises an oral cavity, the rigid surface comprises a tooth surface of the oral cavity, and the non-rigid surface comprises a non-tooth surface of the oral cavity.

* * * * *